United States Patent [19]
Bevill, Jr. et al.

[11] Patent Number: 5,802,151
[45] Date of Patent: Sep. 1, 1998

[54] TELEPHONE INTERFACE PROTECTION CIRCUIT AND MODEM USING SAME

[75] Inventors: Beymer Bevill, Jr., Fuquay-Varina; William James Kalin, Raleigh; Todd Morgan Rasmus; James William Sylivant, both of Cary; Peter Roy Tomaszewski, Wake Forest, all of N.C.

[73] Assignee: International Business Machines Corporation, Armonk, N.Y.

[21] Appl. No.: 632,946

[22] Filed: Apr. 16, 1996

[51] Int. Cl.$^6$ .................................................. H04M 11/00
[52] U.S. Cl. ...................... 379/93.05; 379/2; 379/27; 379/412; 375/222
[58] Field of Search ........................... 375/220, 222; 379/93.01, 93.05, 93.06, 93.26, 93.28, 1, 27, 28, 32, 34, 412; 361/119

[56] References Cited

U.S. PATENT DOCUMENTS

| | | | |
|---|---|---|---|
| 4,055,733 | 10/1977 | Holsinger et al. | 179/175.3 R |
| 4,137,556 | 1/1979 | Sessa | 375/222 |
| 4,296,375 | 10/1981 | Takezaki | 324/103 P |
| 4,417,099 | 11/1983 | Pierce | 179/2 DP |
| 5,218,616 | 6/1993 | Stephens | 379/27 |
| 5,224,154 | 6/1993 | Aldridge et al. | 379/93 |
| 5,245,654 | 9/1993 | Wilkison et al. | 379/405 |
| 5,315,651 | 5/1994 | Rahamim et al. | 379/412 |
| 5,369,687 | 11/1994 | Farkas | 379/98 |
| 5,390,231 | 2/1995 | Hung et al. | 379/412 |
| 5,392,349 | 2/1995 | Elder, Jr. | 379/412 |
| 5,532,898 | 7/1996 | Price | 361/119 |
| 5,539,801 | 7/1996 | Herh et al. | 379/1 |
| 5,577,115 | 11/1996 | Deutsch et al. | 379/412 |

OTHER PUBLICATIONS

Documentation for IBM Part Number 73G5395.

*Primary Examiner*—Curtis A. Kuntz
*Assistant Examiner*—Stephen W. Palan
*Attorney, Agent, or Firm*—John D. Flynn; Steven B. Phillips

[57] ABSTRACT

A telephone interface protection circuit and modem incorporating the telephone interface protection circuit. The circuit includes a sensing circuit and a determining circuit. The interface protection circuit checks for an active telephone line and checks the line for over-current conditions caused when a modem designed for the public switched telephone network is plugged into a private digital telephone network. The circuit functions when the modem is operating to provide continuous monitoring. It can be built as a stand-alone device or incorporated into a modem. The circuit notifies the user of the line condition either with LEDs or with a status message sent to the user via the host computer interface.

15 Claims, 6 Drawing Sheets

TELEPHONE INTERFACE PROTECTION CIRCUIT AND MODEM USING SAME

BACKGROUND

1. Field of the Invention

This invention relates to modems. More specifically, this invention relates to the circuitry that interfaces a modem directly to a telephone network. This circuitry is often called the data access arrangement or "DAA".

2. Description of the Problem

Recent advances in modem technology have made high-speed data transmission between computers possible over a public switched telephone network (PSTN). Additionally, advances in microelectronics have made it possible to build a high-speed modem on a very small circuit board which offers the capabilities of both high speed data transmission and portability. Such circuit boards today are routinely packaged in the form of a PC card or PCMCIA adapter with connectors to make them usable in small laptop and notebook computers. The traveler using a laptop computer can have instant communications by simply plugging a standard telephone cable into a phone jack.

In parallel with the above developments, many businesses have turned to private digital telephone networks. These private networks are controlled by a digital private branch exchange or "PBX". These digital networks are incompatible with standard analog telephones and modems designed for the PSTN; however, the connectors used to interface devices to such private networks are typically the same standard RJ-11 connectors used to interface devices to the PSTN.

Figure 1:
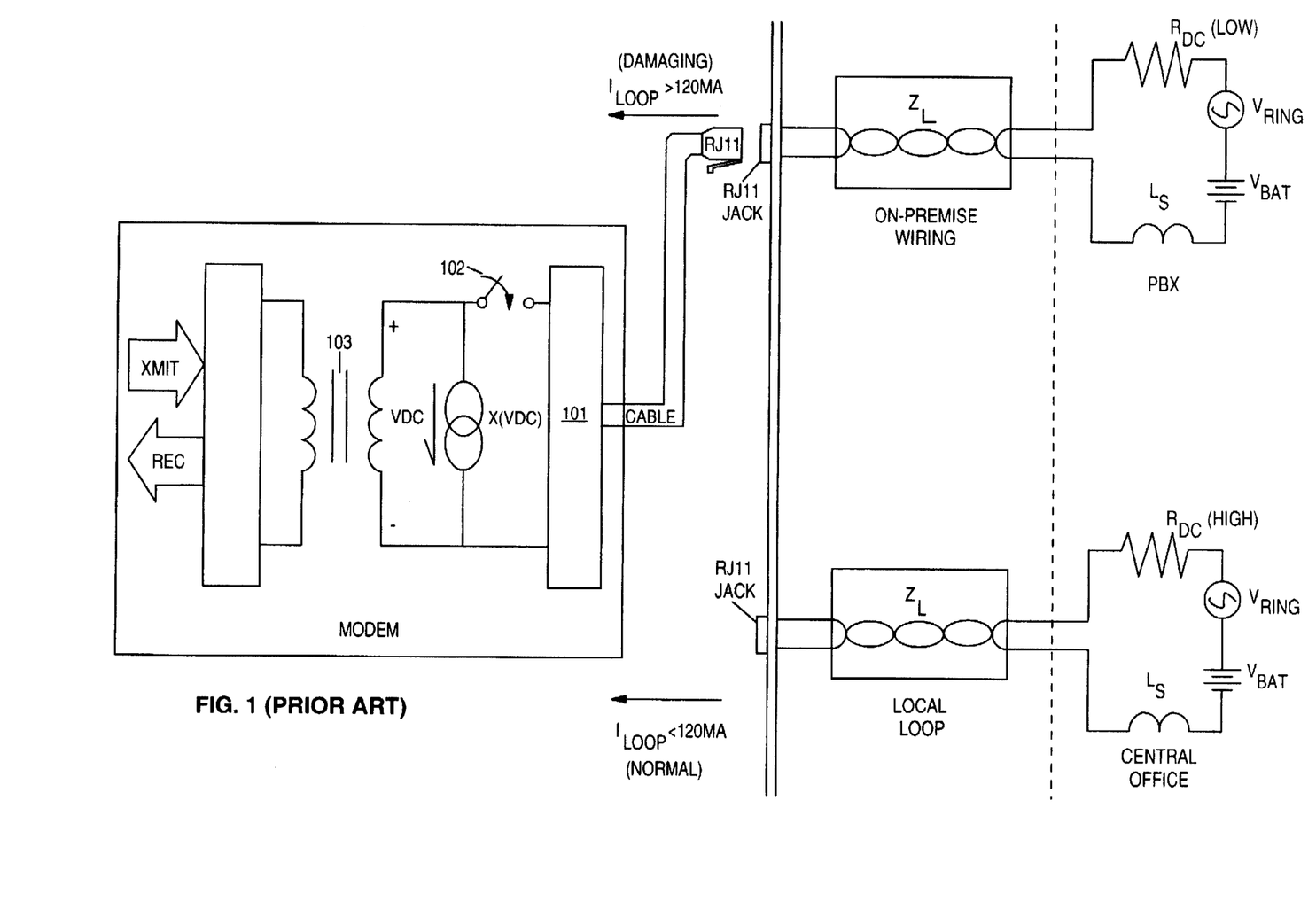
FIG. 1 illustrates a modem being accidentally connected to the wrong type of telephone network.

The situation described above creates a serious problem in that the telephone network interface circuitry that provides isolation between a conventional analog modem's microprocessor-based control circuitry and the telephone network is designed for the PSTN, which presents a lower current capacity to the modem than does a private digital network. This interface circuitry is often called the data access arrangement or DAA. If an analog modem designed for a public switched telephone network is accidentally plugged into a private digital network, damaging current flow in the modem's DAA may result. This situation is illustrated in FIG. 1. The modem's interface circuitry comprises a diode bridge 101 and a transformer 103. When the modem hook switch 102 closes, damaging current flow may occur if the modem is accidentally connected to private, on-premise wiring which is in turn connected to a PBX, as opposed to local loop wiring which is in turn connected to the telephone company central office. Because both the PSTN and on-premise digital networks use the same physical connector, such accidental connections do occur.

One method of building protection from this condition into a modem is to provide a positive temperature coefficient (PTC) resistor in series with the off hook switch. The onset of excessive current flow heats the device, increasing its resistance and reducing the loop current to a safe magnitude. Besides giving the user no indication of the status of the modem connection, the PTC resistor may not heat up fast enough to protect the modem. Additionally, PTC devices are typically quite large, and therefore difficult to fit in a small laptop modem package.

Some solid-state hook switch relay manufacturers are now offering current limiting options designed to limit current during an overload. These devices typically work only for a limited time, leaving the modem circuitry vulnerable to sustained high-current. Also, these devices provide no status information to the user.

The assignee of the present application has developed and currently markets the IBM Modem Saver, Part Number 73G5395, which aids in preventing modem damage due to the accidental connections described above. The IBM Modem Saver is a pocket-sized test device which contains a saturated switch circuit and a voltage detection circuit. It can be plugged into a telephone jack BEFORE a modem is plugged in. Status LEDs on the Modem Saver indicate whether normal voltage and current conditions exist at the telephone jack or whether a dangerous over-current condition will result if a modem is connected.

The IBM Modem Saver has saved many modems from damage due to being connected to the wrong type of telephone network. However, use of the IBM Modem Saver has several disadvantages. It must be used separately and apart from the modem. The user must remember to check the telephone line ahead of time. Also, if a building owner makes wiring changes so that a telephone jack changes from being connected to the PSTN to being connected to a PBX, the modem user may not realize this and may not check the jack again if it was safe at some earlier date.

A modem protection circuit is needed that can be built into the modem or into a device that can remain permanently attached to the modem. Such a device should check the line every time the modem tries to go off hook and monitor the condition of the telephone line while the modem is being used.

SUMMARY

The present invention solves the problems described above by providing a telephone interface protection circuit which can remain connected to the telephone interface at all times, even while the modem is operating. The circuit is small and efficient. It can be packaged as an add-on device that can be left in place. It is also possible to build the circuit into a modem so as to create a modem with built-in line monitoring and protection. The device notifies a user if the telephone line is active and safe to use. It also notifies the user if the line is active and a dangerous over-current condition is present, and prevents the modem from going off hook if doing so might damage the modem DAA circuitry.

The circuit is connected to a telephone network in parallel with a modem or modem circuitry. A sensing circuit is connected across the telephone network for sensing whether an active telephone network is connected to the circuit. The sensing circuit in one embodiment includes a first switch and an active line sensing circuit including a first status LED, and a zener diode. The telephone interface protection circuit also includes a determining circuit which determines if a test voltage across a current source connected across the telephone line is greater than a pre-determined safe voltage and signals the user of a potentially dangerous condition. In the preferred embodiment the determining circuit includes a second switch, the current source, and a voltage comparison circuit which includes status LEDs which serve to indicate the status of the telephone network. The voltage comparison circuit can be comprised of a comparator receiving input from a voltage reference and a point between the second switch and the current source. The comparator controls the state of a latch which is connected between the first status LED and the zener diode. A microcontroller or microprocessor sends and receives signals to and from all of the above circuits, and inhibits the modem hook switch from closing if the voltage presented to the determining circuit during the test is higher than the predetermined safe value. The microcontroller can also drive additional LEDs which provide further information to the user.

The circuit described above can be built into a separate device which is attached to the modem. The circuit can also be built onto the same circuit board and in the same package as the modem module, the hook switch, and the other components of a modem, thereby creating a modem with built-in interface protection. In this case the modem package is designed so that the status LEDs are mounted in such a way as to be visible to the user.

In another embodiment, the circuit can be built into a modem with no status LED's and with no separate microcontroller as part of the interface protection circuit. In this embodiment, the circuit is controlled and the hook switch is inhibited by the same microprocessor which performs the modem function. This microprocessor is included in the modem together with a data pump, a host computer interface, and the hook switch. The microprocessor monitors the condition of the telephone network through the interface protection circuit. Instead of notifying a user of the status of the network with LED's, the microprocessor signals the host computer through the host computer interface. A status message is displayed to the user on the host computer display by the communications program in use, in much the same way messages about the connection progress are displayed. In some cases the data pump function can be performed by the microprocessor instead of by a separate chip. This is typically the case where a digital signal processor or DSP is used to perform the modem function.

The telephone interface protection circuit is operated as follows. The circuit waits for an off hook request. When an off hook request is received, the circuit checks for an active telephone line. If an active line is detected, a determining circuit is activated to determine if the test voltage presented when a current source is activated is greater than a reference voltage, which is set to a pre-determined safe value. If the voltage presented to the determining circuit is greater than the reference voltage, a danger flag is set and the microcontroller or microprocessor prevents the hook switch from closing and signals the user.

If the voltage is safe, a check is made to see if the danger flag has been previously set on. If so, the process is repeated. This assures that if a line has suddenly become safe since the modem was connected, a full test is performed again. Once the testing process is complete, the circuit switches open to disconnect the telephone interface protection circuit from the line for at least one second before going off hook, so that the central office will return a dial tone when the modem finally goes off hook. The circuit then checks for dialing pulses, and allows them to be completed if there are any. The circuit then goes into a continuous monitoring mode.

The present invention provides for a telephone interface protection circuit and alternatively, for a complete modem which automatically checks and monitors the telephone line for dangerous over-current conditions that may damage the modem's DAA. These conditions are normally the result of connecting a modem designed for the analog PSTN to an on-premise PBX. The invention operates continuously without user intervention.

DETAILED DESCRIPTION OF THE PREFERRED EMBODIMENTS

The circuit disclosed here provides interface protection to the modem circuitry by first testing the electrical characteristics of a connected phone network for safe operating conditions before enabling the modem to go off-hook. The circuit attempts to sink a specified amount of current from the attached telephone network, the electrical characteristics of which are unknown. The voltage across the telephone network connection during this time is proportional to the current capacity (also called the "stiffness") of the voltage source implemented by the digital network or PSTN and is compared to a reference voltage. The modem is allowed to go off-hook only if the measured voltage is less than the reference voltage. An LED indicates safe operation, while another, flashing LED, indicates a network characteristic unsafe for reliable operation. In the preferred embodiment, a 100 mA current source is used. A green LED indicates reliable operation while a flashing yellow LED indicates the network is not safe.

Figure 2:
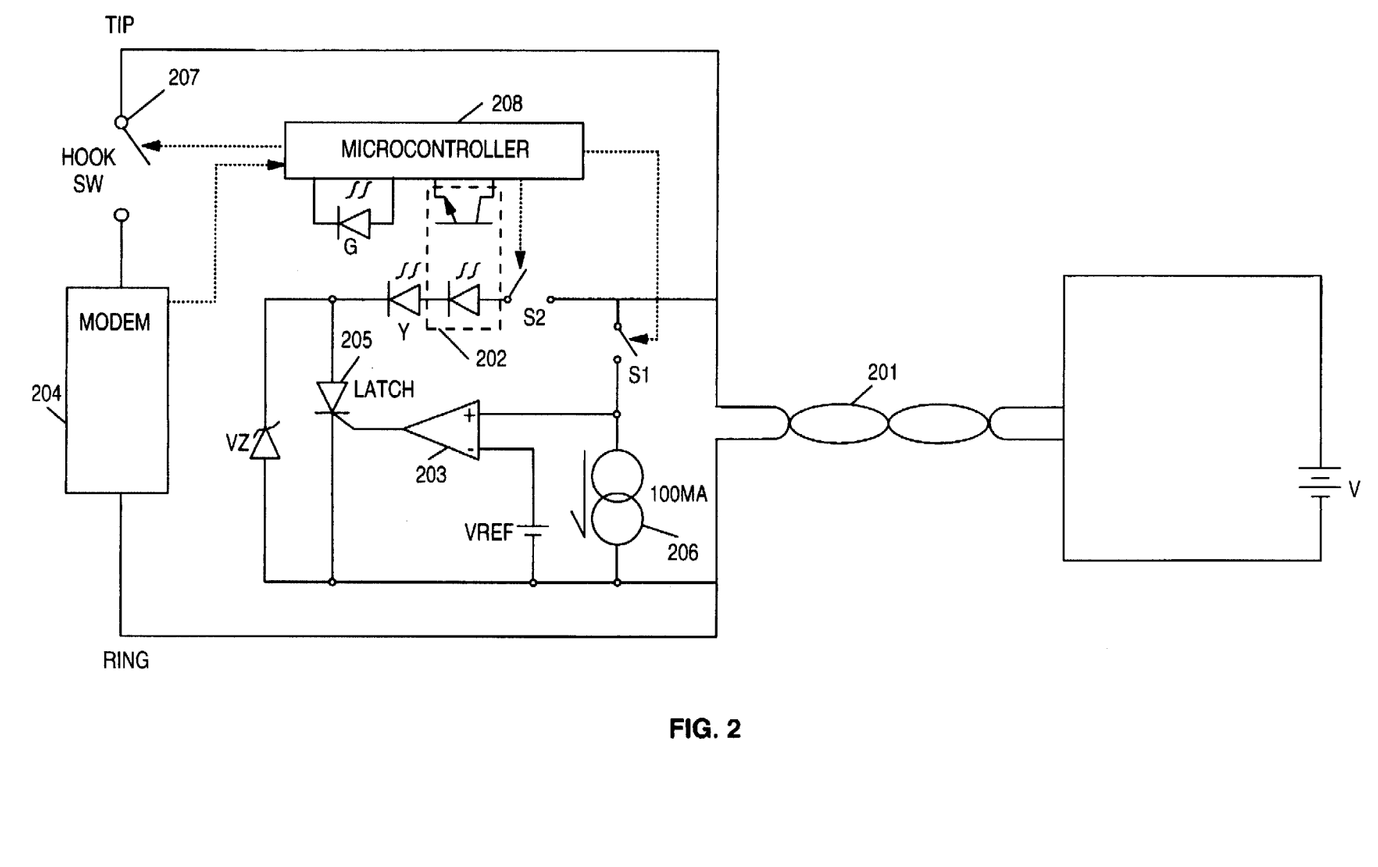
FIG. 2 is a functional block diagram of the interface protection circuit of the present invention.

Referring to FIG. 2, when the circuit is first connected to a telephone network, the microcontroller will wait until an off hook command is given by the modem 204 before closing switch S2. Note the dotted lines on FIG. 2 indicate control or status lines by which the microcontroller can open or close a switch or receive commands and status from the modem. Active line sense circuitry composed of the zener diode $V_z$, and LED Y, and the LED portion of opto-isolator 202, tests to ensure an active telephone network has been connected. If the voltage at the telephone network 201 exceeds approximately 23 volts, the network is deemed active. If the network is active, the microcontroller opens switch S2 and activates the 100 mA current source 206 by closing switch S1. Once the 100 mA current source is activated and settled, the microcontroller again closes switch S2.

Once activated, the voltage across the 100 mA current source is an indication of the current capacity of the connected telephone network. This voltage is compared to a reference voltage $V_{ref}$ by the voltage comparator 203. If the voltage exceeds the reference potential, the latch 205 will activate, allowing bias current to flow through opto-isolator 202 and LED Y. The connected telephone network is judged unsafe for reliable modem operation and the microcontroller 208 will not allow closing of the modem's off hook switch 207. LED Y on indicates to the user the unsafe characteristic of the telephone network. The microcontroller blinks LED Y by controlling the actuation sequence of both switches S1 and S2.

If the voltage measured across the 100 mA current source 206 is less than the reference voltage, the connected telephone network is deemed safe for reliable modem operation. The microcontroller opens both switches S1 and S2, then allows the activation of the modem's off-hook switch relay after a one second time delay. This time delay is necessary for the central office to distinguish the test sequence described from the modem going off hook. The microcontroller activates LED G as an indication to the user that the connected telephone network is safe for data transmission. Finally, the microcontroller closes switch S2 and continuously monitors the telephone network network for a sudden increase in tip/ring voltage which might otherwise damage the modem's DAA. During normal modem operation, the voltage across tip/ring is typically 6 to 12 volts. Should the tip/ring voltage exceed $V_z$ due to a line fault condition, current flow in the opto-isolator will notify the microcontroller that protective action must be taken. The microcontroller will then begin to retest the connected telephone network, and the complete test sequence is repeated.

Figure 3:
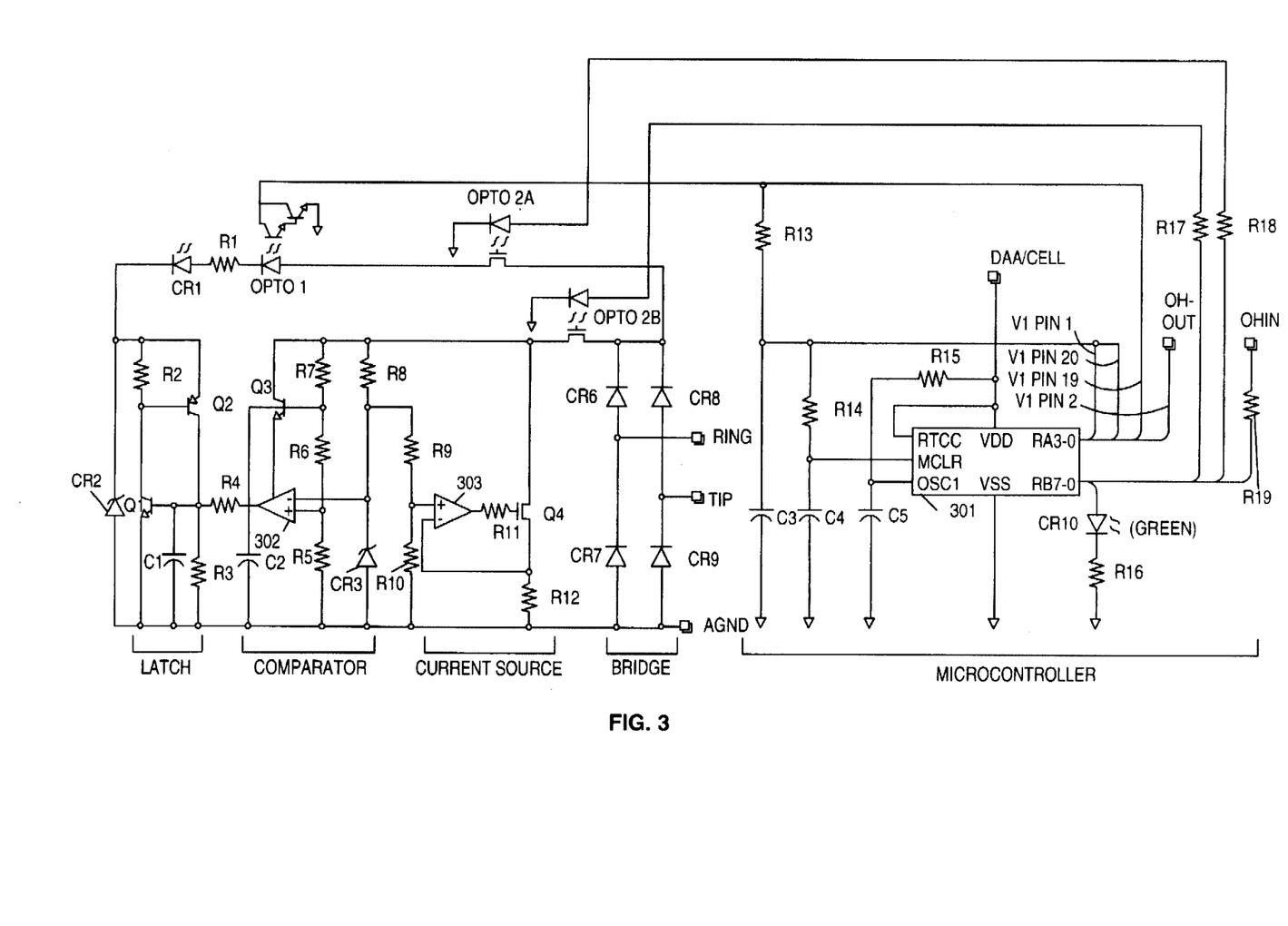
FIG. 3 is a schematic diagram of one embodiment of the circuit of the present invention.

FIG. 3 shows a detailed schematic diagram of one of several possible implementations of the circuit of FIG. 2. The latch section, comparator section, current source section and microcontroller section are labeled. The circuit also shows a diode bridge circuit which interfaces with the telephone network. The microcontroller-actuated FET switches labeled OPTO 2A and 2B control the activation states of these sections. Furthermore, the microcontroller section comprised of microcontroller 301, R13–R19, C3–C5, and CR10 controls the activation state of the modem's off-hook switch relay (not shown in schematic). In this embodiment, microcontroller 301 is a P1C16C54A microcontroller supplied by MicroChip Technology, Incorporated.

The 100 mA current source consists of op amp 303 R11, R12, and Q4. Connected to the positive (non-inverting) input of op amp 303 is a voltage reference composed of CR3 and R8–R10. Configured with negative feedback, op amp 303 adjusts the gate voltage of Q4 to a level necessary to force the voltage across R12 to equal the reference voltage. When the voltages are equal, the current flowing through R12 is equal to the reference voltage divided by the resistance of R12.

The voltage comparator function is performed by comparator 302 and a threshold-setting divider network composed of CR3 and R8. Components Q3, R5, R6, R7, and C2 help provide a scaled-down quiet supply voltage for comparator 302. A scaled-down voltage proportional to the voltage across the 100 mA current source is connected to the positive (non-inverting) input of comparator 302. A threshold reference voltage determined by CR3 is connected to the negative (inverting) input. When the voltage across the 100 mA current source exceeds the threshold voltage, the comparator output transitions low to high and triggers the latch. The latch is configured as an SCR and consists of Q1 and Q2. Components C1, R2, and R3 help prevent the SCR from being falsely triggered by noise or other transients. The regenerative nature of the SCR's positive feedback ensures the latched state is maintained.

Once the latch is triggered, current will flow through OPTO 1 and inform the microcontroller that the voltage threshold across the 100 mA current source has been exceeded. Current also flows through CR1 (yellow LED) indicating an unsafe telephone network characteristic. The microcontroller blinks the yellow LED by controlling the actuation sequence of both Opto 2A and 2B. The active line sense circuitry consists of CR1, CR2, R1, and OPTO 1 and is used by the microprocessor to sense if an active telephone network is attached. If the network voltage exceeds 23 volts, the network is deemed "active", and subsequent current flow through OPTO 1 informs the microcontroller. The active line sense circuitry is used to monitor the telephone network for changes in line voltage once the modem is off-hook. Under normal circumstances, the tip/ring voltage is 6 to 12 volts. If the tip/ring voltage exceeds 23 volts, the microcontroller will take the appropriate protective action.

The circuit can be built as a stand-alone adapter which plugs in between the modem and the telephone network. The adapter can be kept in place on the modem at all times, so that the user's modem is always protected from dangerous over-current conditions. The circuit can also be integrated into the same package as the modem, and built on the same circuit board as the modem circuitry. This embodiment provides a modem in one package with built-in protection against dangerous over-current conditions caused by the modem being plugged into the wrong type of telephone network.

Figure 4:
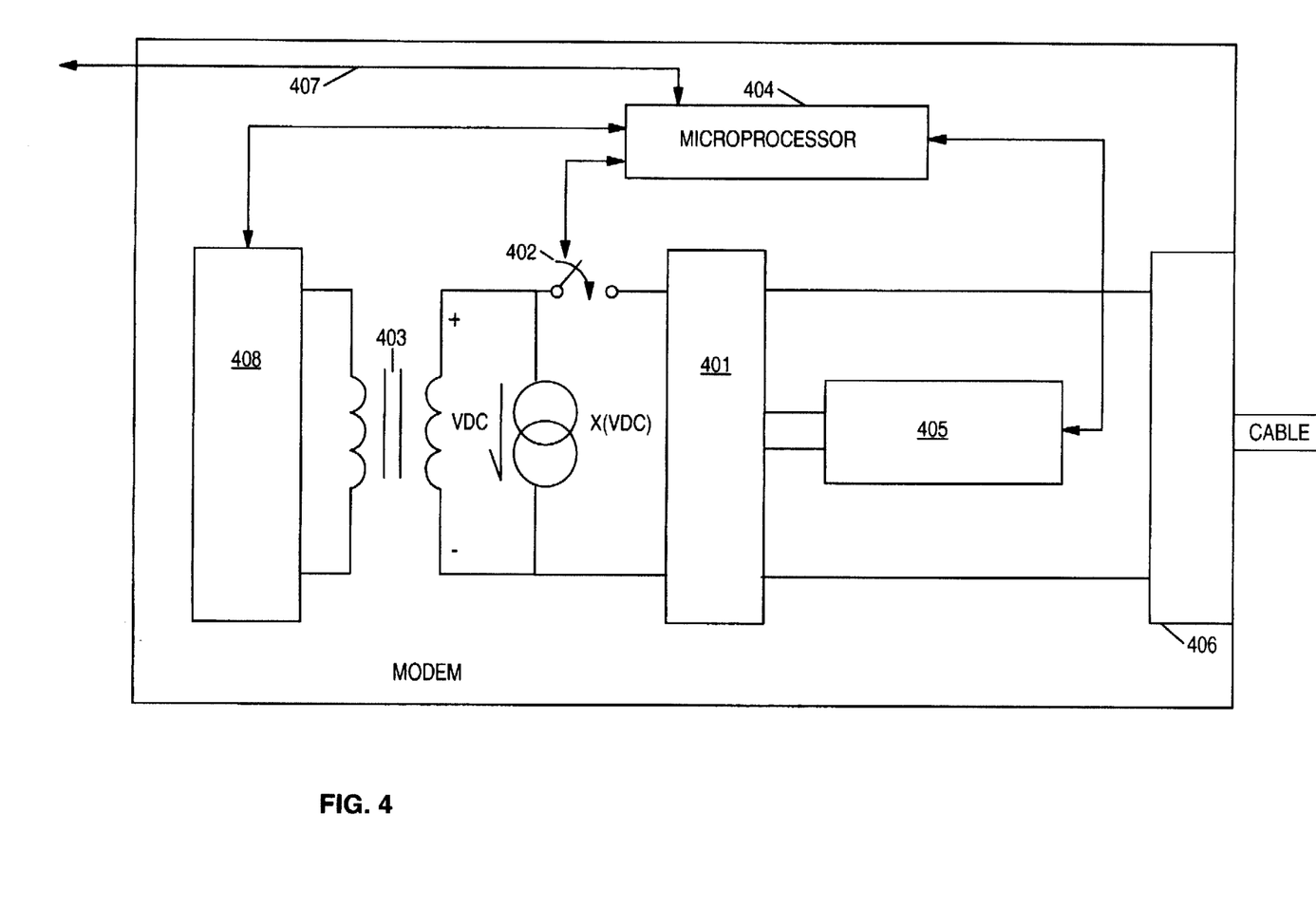
FIG. 4 shows a functional block diagram of a modem incorporating the present invention in which the same microprocessor controls both the modem function and the interface protection circuit.

FIG. 4 shows another embodiment of a modem which includes an interface protection circuit according to the present invention. In FIG. 4, the microprocessor 404 which provides modem function also acts as the microcontroller for the interface protection circuit 405. The modem is connected to the network through a cable attached to connector 406. The protection circuit 405 together with the hook switch 402 and transformer 403 are connected to the telephone network through the diode bridge 401. The microprocessor controls the data pump 408 and sends and receives data to the host computer through the host computer interface 407. If a digital signal processor (DSP) is used as the main microprocessor for this embodiment, the data pump function is performed by the DSP and the data pump 408 and microprocessor 404 are in effect integrated together on the same chip. This embodiment has the advantage of not requiring LEDs to notify the user of the status of the connection. The microprocessor or DSP can instead send messages to the host computer through the host computer interface 407 and the host computer can, in turn, display the message to the user on a display screen.

Figure 5A:
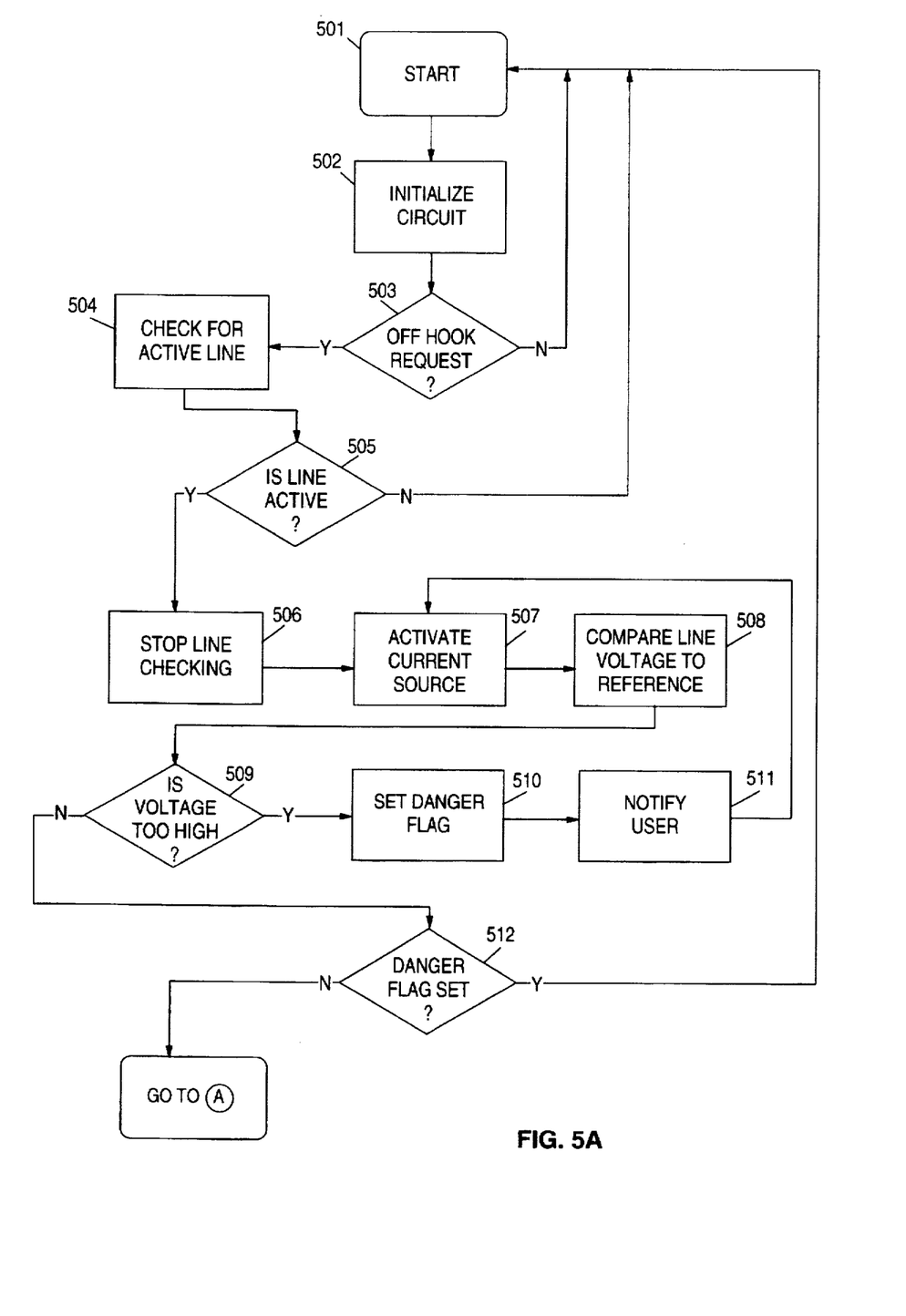
FIG. 5 is a flowchart illustrating the method of operation of the protection circuit. The figure is divided into two parts.
Figure 5B:
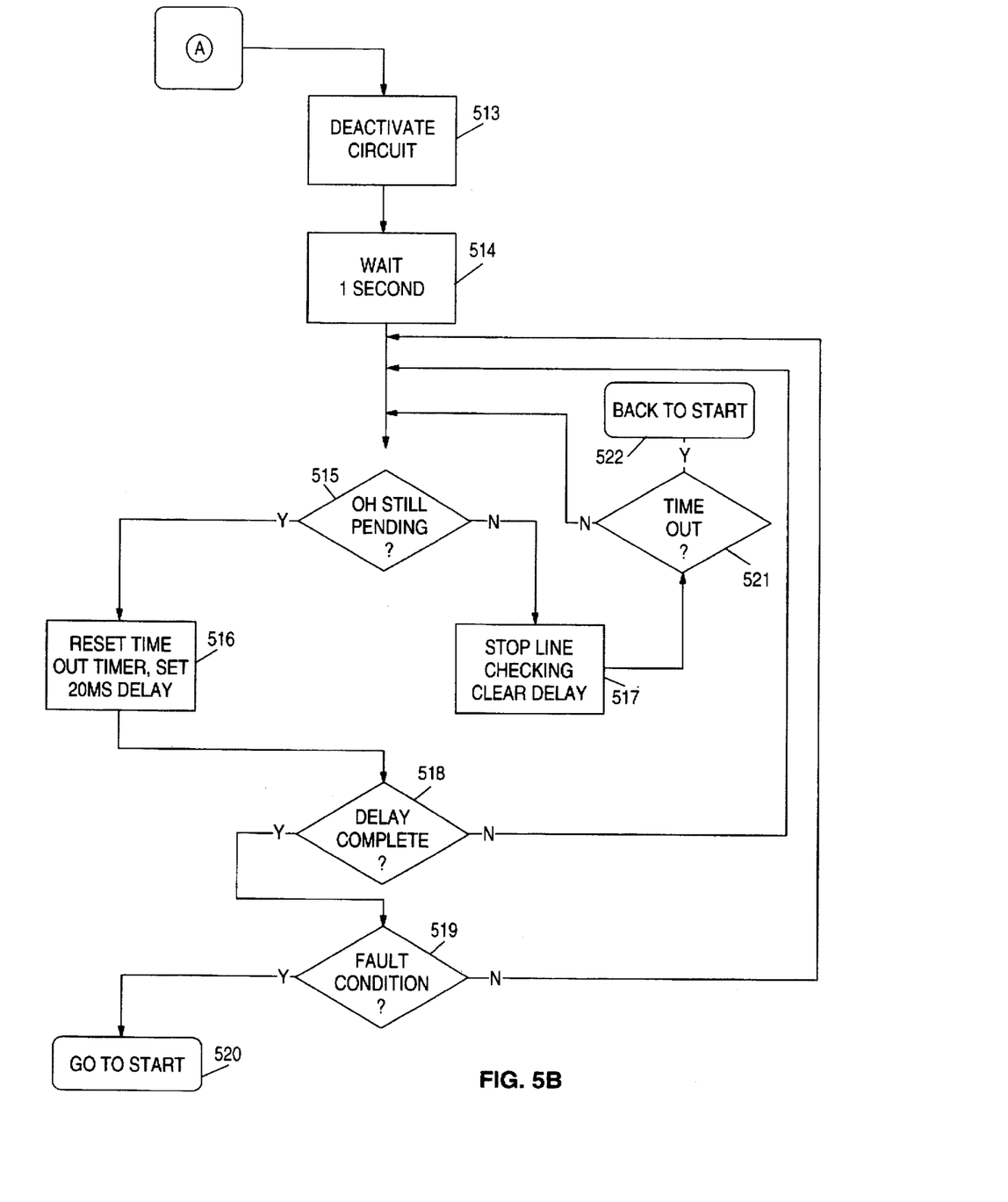

FIG. 5 shows a flowchart which describes the method of operation of the interface protection circuit of the present invention. FIG. 5 is divided into two parts FIG. 5A and FIG. 5B for convenience. The starting and return point for the method is at 501. The interface protection circuit is initialized at 502 and the circuit waits for an off hook request at 503. When an off hook request is received, the circuit checks for an active line at 504 and 505. If the line is inactive, the circuit returns to the starting point. If the line is active the line checking portion of the circuit is switched off, disabling line checking at 506 and the current source is activated at 507. The test voltage generated across the current source by the telephone line is compared to the reference voltage at 508. The result of the comparison is checked in step 509. If the test voltage is too high, a danger flag is set at 510 and the user is notified at 511. If the voltage is not too high, the circuit checks to see if the danger flag was set on during the last test at 512, and if so, returns to the start, eventually to re-check the line when another off hook request is received. This ensures the line will be completely re-checked if it suddenly becomes safe. If the danger flag was not previously set on, the entire protection circuit is deactivated at 513 and waits one second at 514.

At 515 the circuit checks to see if an off hook request is still pending. This step, as well as steps 516, 517, 518, 521 and 522, is necessary to accommodate dialing pulses. This part of the routine is optional; however, the circuit will only work with tone dialing systems if it is omitted. If the off hook request is still pending, a 20 millisecond delay is set at 516. This delay is necessary to cause the circuit to wait long enough so that a dialing pulse will cause the off hook request to no longer be pending. At 516 the circuit also resets a time-out timer for the microcontroller or microprocessor. Such a timer is often referred to as a "watchdog" timer. If the off hook request continues to be pending, the circuit continues when the 20 ms delay is complete at 518. At 519, the circuit begins checking for a fault condition while the call is in progress by monitoring the tip/ring voltage as previously described. If a fault condition is detected, the circuit returns to the start block 501 via step 520 and tests the telephone network again or waits for a new off hook request.

If the off hook request is no longer pending at 515, the circuit assumes the telephone line is being pulsed for pulse dialing. The 20 ms delay is cleared at 517 and the circuit loops back to 515 to check to see if the off hook request is pending. If pulse dialing is occurring, the off hook request will be pending again after each pulse, causing the delay to be repeatedly reset until the pulse dialing is complete. If the off hook request is no longer pending because the user has caused the modem to hang up, the time-out timer for the microcontroller or microprocessor will eventually time out at 521. When the timeout timer times out, the circuit re-initializes at 522.

We have described an embodiment of a telephone interface protection circuit and a method of operating such a circuit. We have also described two embodiments of a modem incorporating such a circuit. The circuit is small, efficient, and provides continuous monitoring of the telephone connection of a modem to prevent damage caused by plugging the modem into a high-current private digital telephone network. The circuit also notifies the user of the condition. While we have described only certain embodiments, one of ordinary skill in the art will easily recognize there many other possible embodiments of the invention.

We claim:

1. A telephone interface protection circuit comprising:
   a sensing circuit for connection to a telephone network for sensing whether an active telephone network is connected to the telephone interface protection circuit;
   a determining circuit connected in parallel with the sensing circuit, the determining circuit having a current source for loading the active telephone network after the sensing circuit has sensed that the telephone interface protection circuit is connected to the active telephone network, the determining circuit measuring a test voltage across the current source after loading the active telephone network, and for determining if the test voltage is greater than a pre-determined safe voltage and for signaling as to whether the test voltage is greater than the pre-determined safe voltage; and
   a microcontroller connected to the sensing circuit and the determining circuit, the microcontroller disposed to control and receive signals from the sensing circuit and the determining circuit and to inhibit a hook switch from closing if the determining circuit indicates that the test voltage is greater than the pre-determined safe voltage.

2. A modem comprising:
   a modem module and a hook switch disposed in series for connection across a telephone network; and
   a telephone interface protection circuit for connection across the telephone network, the telephone interface protection circuit further including a sensing circuit for sensing whether an active telephone network is connected to the telephone interface protection circuit, a determining circuit connected in parallel with the sensing circuit, the determining circuit having a current source for loading the telephone network after the sensing circuit has sensed that the telephone interface protection circuit is connected to the telephone network, the determining circuit measuring a test voltage across the current source after loading the telephone network, and for determining if a test voltage is greater than a predetermined safe voltage and signaling as to whether the test voltage is greater than the pre-determined safe voltage, and a microprocessor connected to the sensing circuit and the determining circuit, the microprocessor disposed to control and receive signals from the sensing circuit and the determining circuit and to inhibit the hook switch from closing if the determining circuit signals that the test voltage presented to the determining circuit is greater than the pre-determined safe voltage.

3. A telephone interface protection circuit comprising:
   a first switch and an active line sensing circuit disposed in series for connection across a telephone network, the active line sensing circuit further including a first status LED and a zener diode;
   a second switch and a current source disposed in series for connection across the telephone network;
   a voltage comparison circuit disposed for connection to one side of the telephone network and further connected to a first point between the first status LED and the zener diode and to a second point between the second switch and the current source, the voltage comparison circuit disposed so that when a voltage across the current source is greater than a predetermined safe voltage with both first and second switches closed, the first status LED lights; and
   a microcontroller disposed to control the opening and closing of the first and second switches and a hook switch, wherein the microcontroller causes the second switch to close and the first switch to open in response to an off hook command and the active line sensing circuit sensing an active telephone network, the microcontroller further inhibiting a hook switch from closing if the voltage comparison circuit indicates that the voltage across the current source is greater than the predetermined safe voltage.

4. The telephone interface protection circuit of claim 3 wherein the voltage comparison circuit further comprises:
   a comparator having first and second inputs and an output, the first input connected to the second point between the second switch and the current source;
   a voltage reference connected between the second input of the comparator and disposed for connection to the one side of the telephone network; and
   a latch connected to the output of the comparator and also disposed for connection to the one side of the telephone network and to the first point between the first status LED and the zener diode.

5. The telephone interface protection circuit according to either claim 3 or claim 4 further including a second status LED and a third status LED, the second status LED connected in series with the first status LED so that it notifies a user when an over-voltage condition is detected, the third status LED connected to the microcontroller so that the microcontroller causes the third status LED to notify a user when the telephone network is operating normally.

6. A modem comprising:
   a modem module and a hook switch disposed in series for connection across a telephone network; and
   a telephone interface protection circuit for connection across the telephone network, the telephone interface protection circuit further comprising:
   a first switch and an active line sensing circuit disposed in series for connection across the telephone network, the active line sensing circuit further including a first status LED and a zener diode;
   a second switch and a current source disposed in series for connection across the telephone network;
   a voltage comparison circuit for connection to one side of the telephone network and further connected to a first point between the first status LED and the zener diode and to a second point between the second switch and the current source, the voltage comparison circuit disposed so that when the voltage across the current source is greater than a predetermined safe voltage with both first and second switches closed, the first status LED lights; and a microcontroller disposed to control the opening and closing of the first and second switches and a hook switch, wherein the microcontroller causes the second switch to close and the first switch to open in response to an off hook command and the active line sensing circuit sensing an active telephone network, the microcontroller further inhibiting a hook switch from closing if the voltage comparison circuit indicates that the voltage across the current source is greater than the predetermined safe voltage.

7. The modem of claim 6 wherein the voltage comparison circuit further comprises:

a comparator having first and second inputs and an output, the first input connected to the second point between the second switch and the current source;

a voltage reference connected between the second input of the comparator and disposed for connection to the one side of the telephone network; and a latch connected to the output of the comparator and disposed for connection to the one side of the telephone network and further connected to the first point between the first status LED and the zener diode.

8. The modem according to either claim 6 or claim 7 further including a second status LED and a third status LED, the second status LED connected in series with the first status LED so that it notifies a user when an overvoltage condition is detected, the third status LED connected to the microcontroller so that the microcontroller causes the third status LED to notify a user when the telephone network is operating normally.

9. A modem comprising:

a host computer interface;

a data pump disposed to send and receive signals to and from a telephone network and to encode and decode signals for a host computer;

a hook switch connected to the data pump and disposed for connection to the telephone network;

a telephone interface protection circuit for connection across the telephone network, the telephone interface protection circuit further including a sensing circuit for sensing whether an active telephone network is connected to the telephone interface protection circuit, a determining circuit connected in parallel with the sensing circuit, the determining circuit having a current source for loading the telephone network after the sensing circuit has sensed that the telephone interface protection circuit is connected to the telephone network, the determining circuit measuring a test voltage across the current source after loading the telephone network, and for determining if a test voltage presented to the determining circuit is greater than a pre-determined safe voltage and signaling as to whether the voltage presented to the determining circuit is greater than the pre-determined safe voltage; and a microprocessor connected to the telephone interface protection circuit, the hook switch, the data pump, and the host computer interface, the microprocessor for controlling the operation of the modem and communicating between the telephone network and the host computer interface, the microprocessor also programmed to inhibit the hook switch from closing when it receives a signal from the determining circuit indicting that the test voltage presented to the determining circuit is greater than the pre-determined safe voltage and to notify a host computer through the host computer interface of the condition of the telephone network.

10. A method of operating a telephone interface protection circuit for connection to a telephone network, the method comprising the steps of:

waiting for an off hook request;

checking for an active line if the off hook request is received;

loading the active line using a current source and measuring a test voltage across the current source and discontinuing line checking, if the active line is detected;

comparing the test voltage presented to the determining circuit to a reference voltage, the reference voltage being equal to a pre-determined safe voltage;

setting a danger flag on which prevents a hook switch from closing, if the voltage presented to the determining circuit is greater than the reference voltage; and signalling a user of a potentially damaging condition on the telephone network.

11. The method of claim 10, further comprising the steps of:

if the voltage presented to the determining circuit is not greater than the reference voltage, determining if the danger flag has been previously set on; and if the danger flag has been previously set on, re-initializing the telephone interface protection circuit.

12. The method of claim 11, further comprising the steps of:

if the danger flag has not been previously set on, de-activating the determining circuit;

waiting at least one second before closing the hook switch;

checking for dialing pulses;

if no dialing pulses are detected, continuously checking for a fault condition; and re-initializing the telephone interface protection circuit if the fault condition is detected.

13. The method of claim 11, further comprising the steps of:

if the danger flag has not been previously set on, de-activating the determining circuit;

waiting at least one second before closing the hook switch;

continuously checking for a fault condition; and re-initializing the telephone interface protection circuit if the fault condition is detected.

14. The telephone interface protection circuit of claim 1 further comprising:

a timer that inhibits the hook switch from closing for at least one second after the determining circuit indicates that the test voltage is less than or equal to the pre-determined safe voltage.

15. The modem of claim 2 further comprising:

a timer that inhibits the hook switch from closing for at least one second after the determining circuit signals that the test voltage is less than or equal to the pre-determined safe voltage.

* * * * *